under 35 U.S.C. 154(b) by 96 days.

(12) United States Patent
Fan et al.

(10) Patent No.: US 9,844,091 B2
(45) Date of Patent: Dec. 12, 2017

(54) METHOD, DEVICE, AND STORAGE MEDIUM FOR CONTROLLING SIGNAL TRANSMISSION

(71) Applicant: Xiaomi Inc., Beijing (CN)

(72) Inventors: Jialin Fan, Beijing (CN); Qiuzhi Huang, Beijing (CN); Heng Qu, Beijing (CN)

(73) Assignee: Xiaomi Inc., Beijing (CN)

( * ) Notice: Subject to any disclaimer, the term of this patent is extended or adjusted under 35 U.S.C. 154(b) by 96 days.

(21) Appl. No.: 14/843,557

(22) Filed: Sep. 2, 2015

(65) Prior Publication Data

US 2016/0113055 A1    Apr. 21, 2016

Related U.S. Application Data

(63) Continuation of application No. PCT/CN2015/074878, filed on Mar. 23, 2015.

(30) Foreign Application Priority Data

Oct. 17, 2014    (CN) .......................... 2014 1 0555668

(51) Int. Cl.
*H04W 52/02*    (2009.01)
*H04W 76/04*    (2009.01)
(Continued)

(52) U.S. Cl.
CPC ............ *H04W 76/04* (2013.01); *H04W 8/005* (2013.01); *H04W 40/244* (2013.01); *H04W 52/0209* (2013.01); *H04W 52/0216* (2013.01); *H04W 76/027* (2013.01); *H04W 48/02* (2013.01); *H04W 84/12* (2013.01); *H04W 88/02* (2013.01); *H04W 88/06* (2013.01); *H04W 88/08* (2013.01); *Y02B 60/50* (2013.01)

(58) Field of Classification Search
None
See application file for complete search history.

(56) References Cited

U.S. PATENT DOCUMENTS 8,611,268 B1    12/2013    Thandaveswaran
2003/0129966 A1*    7/2003    Le Bars ............... H04W 48/12
455/411
(Continued)

FOREIGN PATENT DOCUMENTS

CN    101873677 A    10/2010
CN    102083192 A    6/2011
(Continued)

OTHER PUBLICATIONS

International Search Report of International Patent Application No. PCT/CN2015/074878, from the State Intellectual Property Office of P.R. China (ISA/CN), dated Jul. 3, 2015 (5 pages).
(Continued)

*Primary Examiner* — Brandon Renner
(74) *Attorney, Agent, or Firm* — Finnegan, Henderson, Farabow, Garrett & Dunner LLP

(57) ABSTRACT

A method for controlling signal transmission includes detecting whether there is a requesting terminal that requests to establish a wireless connection and turning off a sending function of sending beacon frames if there is no requesting terminal.

9 Claims, 5 Drawing Sheets

(51) Int. Cl.
*H04W 8/00* (2009.01)
*H04W 40/24* (2009.01)
*H04W 76/02* (2009.01)
*H04W 88/02* (2009.01)
*H04W 88/08* (2009.01)
*H04W 48/02* (2009.01)
*H04W 84/12* (2009.01)
*H04W 88/06* (2009.01)

(56) References Cited

U.S. PATENT DOCUMENTS

| | | |
|---|---|---|
| 2007/0300290 A1 | 12/2007 | Shay et al. |
| 2008/0101324 A1* | 5/2008 | Stark ............... H04L 63/083 370/345 |
| 2012/0039225 A1 | 2/2012 | Wang |
| 2012/0052793 A1 | 3/2012 | Brisebois et al. |
| 2013/0114488 A1 | 5/2013 | Fang et al. |
| 2014/0269476 A1* | 9/2014 | Weston ............ H04W 52/0206 370/311 |
| 2015/0079939 A1* | 3/2015 | Naka ................... H04W 12/04 455/411 |
| 2015/0172289 A1* | 6/2015 | Kwon ................. H04W 12/08 726/3 |
| 2015/0208451 A1* | 7/2015 | Tzoreff ............. H04W 76/023 370/329 |
| 2016/0044596 A1* | 2/2016 | Iwai ................. H04W 40/246 370/311 |
| 2017/0070955 A1* | 3/2017 | Wu ...................... H04W 52/02 |

FOREIGN PATENT DOCUMENTS

| | | |
|---|---|---|
| CN | 102437897 A | 5/2012 |
| CN | 102685860 A | 9/2012 |
| CN | 102938926 A | 2/2013 |
| CN | 103843417 A | 6/2014 |
| CN | 104066164 A | 9/2014 |
| CN | 104080148 A | 10/2014 |
| CN | 104333890 A | 2/2015 |
| EP | 2 595 433 A1 | 5/2013 |
| JP | 2003348104 A | 12/2003 |
| JP | 2007251564 A | 9/2007 |
| JP | 2009232248 A | 10/2009 |
| JP | 2009302798 A | 12/2009 |
| JP | 2011527867 A | 11/2011 |
| KR | 20140100569 A | 8/2014 |
| RU | 2202855 C2 | 4/2003 |
| RU | 2474967 C2 | 2/2013 |
| TW | 201208418 A | 2/2012 |
| WO | WO 2004/075583 A1 | 9/2004 |
| WO | WO 2010/006142 A1 | 1/2010 |
| WO | WO 2014/160230 A1 | 10/2014 |

OTHER PUBLICATIONS

English version of International Search Report of PCT/CN2015/074878, from the State Intellectual Property Office of China, dated Jul. 3, 2015.
Extended Search Report for European Application No. 15188983.9 from the European Patent Office, dated Jan. 28, 2016.
Office Action dated Oct. 10, 2016, in counterpart Russian Application No. 2015132441/08(049874) and English translation thereof.

* cited by examiner

METHOD, DEVICE, AND STORAGE MEDIUM FOR CONTROLLING SIGNAL TRANSMISSION

CROSS-REFERENCE TO RELATED APPLICATIONS

The present application is a continuation of International Application No. PCT/CN2015/074878, filed on Mar. 23, 2015, which is based upon and claims priority to Chinese Patent Application No. 201410555668.2, filed on Oct. 17, 2014, the entire contents of both of which are incorporated herein by reference.

TECHNICAL FIELD

The present disclosure relates to communication technology and, more particularly, to a method, device, and storage medium for controlling signal transmission.

BACKGROUND

An access point (AP) periodically sends beacon frame signals (Beacon signals). By listening to the Beacon signals, a nearby station or terminal (STA) can discover a corresponding wireless network established by the AP. This process of discovering the wireless network is referred to as a "passive scanning" process.

In the passive scanning process, since the STA only needs to listen to the Beacon signals without actively sending detection signals, power consumption of the STA can be reduced. However, when there is no STA nearby, transmitting the Beacon signals is a waste of wireless resources, which increases the power consumption of the AP.

SUMMARY

In accordance with the present disclosure, there is provided a method for controlling signal transmission. The method includes detecting whether there is a requesting terminal that requests to establish a wireless connection and turning off a sending function of sending beacon frames if there is no requesting terminal.

Also in accordance with the present disclosure, there is provided an electronic device including a processor and a memory storing instructions. The instructions, when executed by the processor, cause the processor to detect whether there is a requesting terminal that requests to establish a wireless connection and turn off a sending function of sending beacon frames if there is no requesting terminal.

Also in accordance with the present disclosure, there is provided a non-transitory computer-readable storage medium storing instructions. The instructions, when executed by a processor of a terminal, cause the terminal to detect whether there is a requesting terminal that requests to establish a wireless connection and turn off a sending function of sending beacon frames if there is no requesting terminal.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Method consistent with embodiments of the present disclosure can be implemented in, for example, an access point (AP). The AP may be a simple AP, which is only used to compile and convert Internet to a wireless network. That is, the simple AP functions as a "switch" in the wireless network environment. Alternatively, the AP may also be an extended AP, i.e., a wireless router. Herein, the AP may be an independent device or a functional module integrated in another device, such as a WIFI (Wireless Fidelity) module in a smart phone, and have a "hotspot" function.

Figure 1:
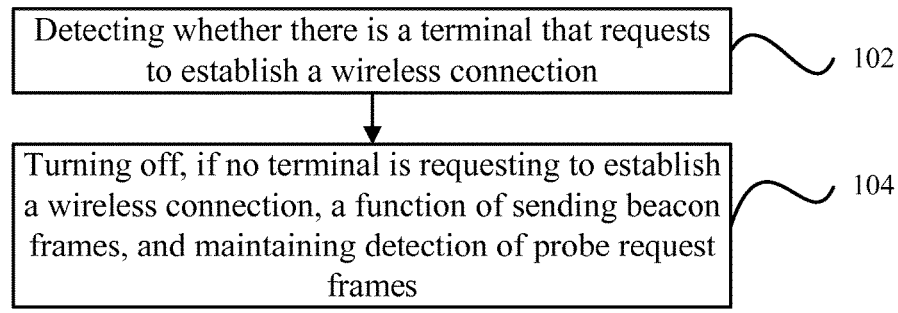
FIG. 1 is a flow chart illustrating a method for controlling signal transmission according to an exemplary embodiment.

FIG. 1 is a flow chart illustrating a method for controlling signal transmission according to an exemplary embodiment. As shown in FIG. 1, at 102, whether there is a terminal that requests to establish a wireless connection, which is also referred to as a "requesting terminal," is detected by, for example, detecting a probe request frame sent by the requesting terminal. Other ways of determining the terminal's connection establishment intention may also be adopted.

At 104, if no requesting terminal is requesting to establish a wireless connection, a sending function of sending beacon frames is turned off. In the meantime, the AP continues to detect probe request frames.

In some embodiments, besides judging whether there is a requesting terminal that requests to establish a wireless connection, a time length during which no terminal requests to establish a wireless connection is also recorded. Such a time length is also referred to as a no-request time length. When the no-request time length becomes longer than a preset time length, the sending function of sending the beacon frames is turned off.

Figure 2:
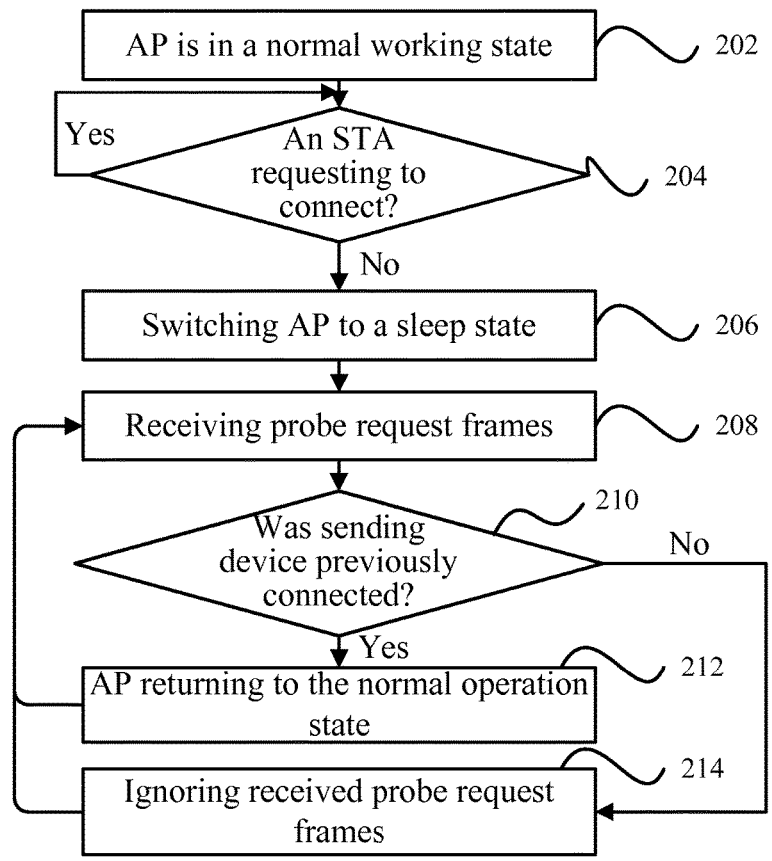
FIG. 2 is a flow chart illustrating a method for controlling signal transmission according to another exemplary embodiment.

FIG. 2 is a flow chart illustrating a method for controlling signal transmission according to another exemplary embodiment. As shown in FIG. 2, at 202, the AP is in a normal operation state. That is, the AP sends beacon frames according to a preset period, and receives probe request frames from stations or terminals (STAs). Here, the "normal operation state" refers to a state different from a "sleep state" described below. In the normal operation state, the AP sends out beacon frames and at the same time detects probe request frames sent by the STAs. Therefore, the wireless network established by the AP can be discovered through both a passive scanning process using the beacon frames and an active scanning process using the probe request frames.

At 204, whether there is an STA that requests to establish a wireless connection with the AP is detected. If an STA requesting to establish a wireless connection is detected, the request is responded to and the AP continues to detect whether there are other STAs that request to establish wireless connection. If no STA is requesting to establish wireless connection, the process proceeds to 206.

In some embodiments, whether an STA is requesting to establish a wireless connection is determined by judging whether probe request frames sent by the STA are received. If the probe request frames are received, it is judged that the STA is requesting to establish a wireless connection. Otherwise, it is judged that no STA is requesting to establish a wireless connection.

In some embodiments, a preset time length, such as one minute, may be set. If no STA requests to establish a wireless connection in a continuous time period greater than or equal to the preset time length, then it is judged that there is no STA that requests to establish a wireless connection, and the process proceeds to 206. On the other hand, if an STA requesting to establish a wireless connection is detected within the period of one minute, the timing is restarted.

At 206, the AP is switched from the normal operation state to the sleep state. In the sleep state, the AP stops sending the beacon frames, but continues to receive probe request frames.

At 208, probe request frames sent by a device are received.

At 210, identification information of the device sending the probe request frames is acquired, and whether the AP has previously established a wireless connection with the device, i.e., whether the device is a strange device, is determined. If the AP has previously established a wireless connection with the device, the process proceeds to 212. If the AP has never established a wireless connection with the device before, then the device is a strange device, and the process proceeds to 214.

The identification information is used to identify and distinguish different hardware devices, and may be, for example, a MAC (Media Access Control) address. In some embodiments, every time after establishing a wireless connection with a device, the AP records the identification information of the device. As such, a "history database" can be established. Then, whether a current STA sending probe request frames is a strange device can be determined by checking against the identification information in the history database.

At 212, the AP returns to the normal operation state, and resends the beacon frames.

A "strange device" may be unsafe and unstable. Therefore, when the STA sending probe request frames is not a strange device, the AP may be regarded as having entered into a safe and stable work environment. In this situation, the AP can be woken up to the normal operation state (212 in FIG. 2). Further, when it is detected that the STA is not a strange device, it is also likely that other devices may need to establish wireless connections with the AP. For example, the AP is a wireless router in a company, and when employees come to work, the mobile devices they carry need to establish wireless connections with the AP. As another example, the AP is a wireless router at home, and when the user and other family members come back home, the mobile devices they carry need to establish wireless connections with the AP. In these cases, the AP returns to the normal operation state, and thus can meet the needs of all of the users.

According to the present disclosure, based on the received probe request frames, the AP can conduct a normal response. For example, the AP can return a probe response frame to the STA sending the probe request frames.

At 214, the received probe request frames from the strange device are ignored.

In the exemplary method described above, a strange device is directly ignored (214 in FIG. 2). In some embodiments, further processes may be performed to determine whether to grant the connection request from a strange device. Examples of such processes are described below with reference to FIGS. 3 and 4. In these exemplary scenarios, the AP may be a wireless router in a user's home, and the STA may be a smart phone carried by a stranger passing by.

Figure 3:
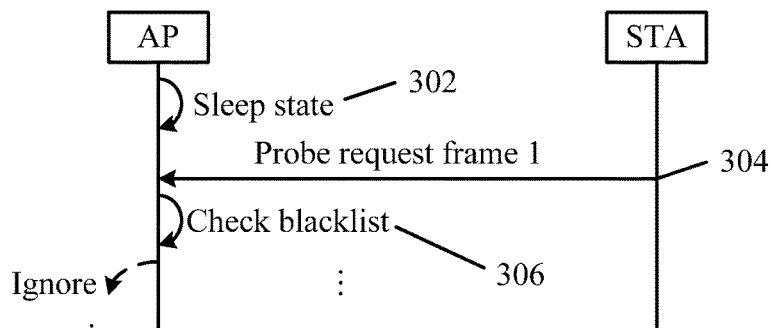
FIG. 3 is a flow chart illustrating a method for controlling signal transmission according to another exemplary embodiment.

FIG. 3 is a flow chart illustrating a method for controlling signal transmission according to another exemplary embodiment. As shown in FIG. 3, at 302, the AP is switched from the normal operation state to the sleep state. The switching process is similar to that in 202 to 206 shown in FIG. 2.

At 304, a probe request frame 1 from the STA is received.

At 306, identification information, e.g., MAC address, of the STA is acquired from the probe request frame 1, and a blacklist is checked to determine whether the blacklist contains a device identification that matches the identification information of the STA. If the blacklist contains a matching device identification, the probe request frame 1 received by the AP is directly ignored, and the AP stays in the sleep state.

In some embodiments, devices in the blacklist may have security risk, or may have attempted to establish a connection but failed. Therefore, by comparing the STA sending the probe request frame with the blacklist, the AP is woken up less frequently. As such, the security is improved and the power consumption of the AP is reduced.

In some embodiments, the history database and the blacklist stored by the AP do not overlap with each other. Thus, the identification information of the STA can be matched with the history database first to determine whether the STA is a strange device, and then be matched with the blacklist if the STA is a strange device. Alternatively, the identification information can be matched with the blacklist first, and is then further matched with the history database if there is no risk.

Figure 4:
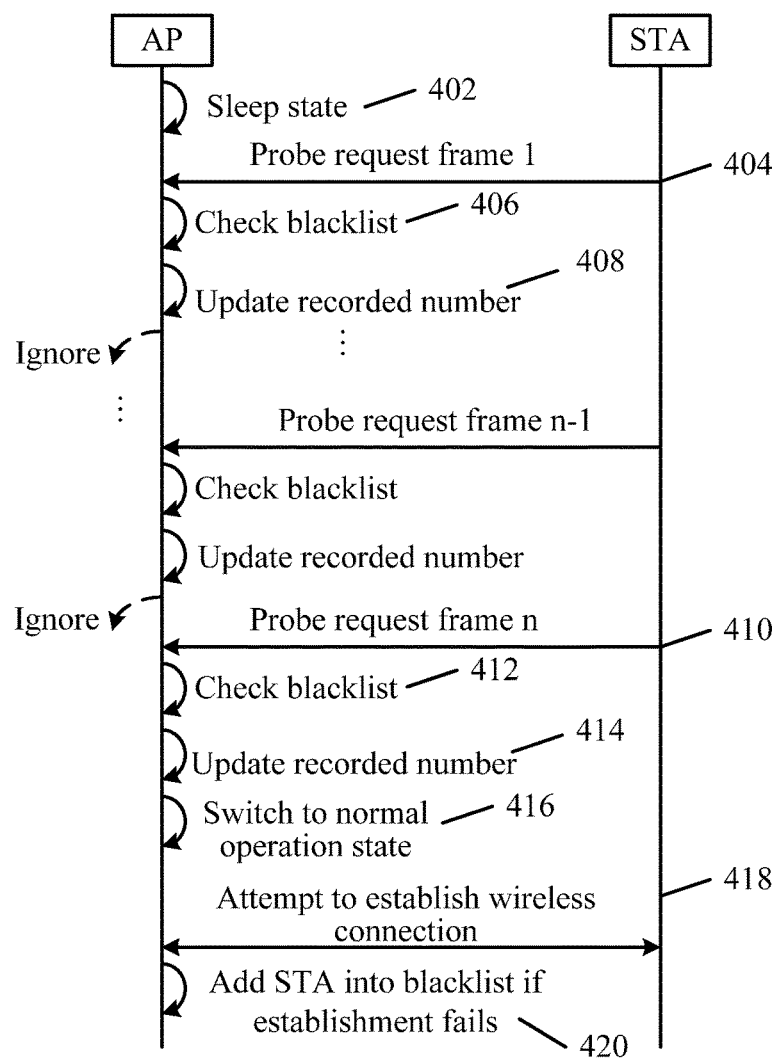
FIG. 4 is a flow chart illustrating a method for controlling signal transmission according to another exemplary embodiment.

FIG. 4 is a flow chart illustrating a method for controlling signal transmission according to another exemplary embodiment. As shown in FIG. 4, at 402, the AP is switched from the normal operation state to the sleep state. The switching process is similar to that in 202 to 206 shown in FIG. 2.

At 404, a probe request frame 1 is received from an STA.

At 406, the STA is checked against a preset blacklist when the STA is determined to be a strange device (as determined by the process in 210 of FIG. 2).

At 408, if the blacklist does not contain a device matching the STA, the number of probe request frames from the STA received by the AP in a preset time period, which is also referred to as an "accumulated number" or a "recorded number," is updated. For example, if it is the first time that a probe request frame from the STA is received, then the recorded number is 1.

A preset number n is set in the AP. When the recorded number is smaller than the preset number n, the current probe request frame is ignored. For example, assuming n=3, the received probe request frame 1 is ignored.

At 410, a probe request frame n from the STA is received.

At 412, when the STA is determined to be a strange device, the STA is checked against the preset blacklist.

At 414, if the blacklist does not contain a device matching the STA, the number of probe request frames from the STA received by the AP in the preset time period is updated. For example, the recorded number is updated to n.

Since the recorded number n equals to the preset number n, the process proceeds to 416, at which an operation state of the AP is switched from the sleep state to the normal operation state, that is, the AP starts to send beacon frames again.

At 418, the AP attempts to establish a wireless connection with the STA by, for example, returning a probe response frame to the STA, and continues to interact with other signals.

At 420, a result of establishing the wireless connection between the AP and the STA is determined. If the establishment fails, the identification information, such as the MAC address, of the STA is added into the blacklist. The next time when the AP receives probe request frames from the STA while in the sleep state, the AP directly ignores the received probe request frames in a manner similar to that shown in FIG. 3, and the operation state of the AP is not switched.

Apparatuses consistent with embodiments of the present disclosure are described below. These apparatuses can be implemented in, for example, an AP.

Figure 5:
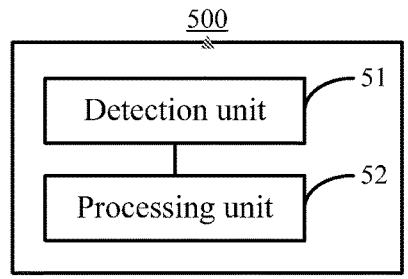
FIG. 5 is a block diagram illustrating an apparatus for controlling signal transmission according to an exemplary embodiment.

FIG. 5 is a block diagram illustrating an apparatus 500 for controlling signal transmission according to an exemplary embodiment. Referring to FIG. 5, the apparatus 500 includes a detection unit 51 and a processing unit 52. The detection unit 51 is configured to detect whether there is a terminal that requests to establish a wireless connection. The processing unit 52 is configured to turn off a sending function of sending beacon frames and continue to detect probe request frames, if there is no terminal requesting to establish a wireless connection.

Figure 6:
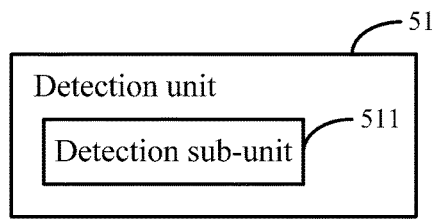
FIG. 6 is a block diagram illustrating an example of the detection unit shown in FIG. 5.

FIG. 6 is a block diagram illustrating an example of the detection unit 51. As shown in FIG. 6, the detection unit 51 includes a detection sub-unit 511 configured to detect whether there is a terminal that requests to establish a wireless connection within a continuous time period of a preset time length. The processing unit 52 then turns off the function of sending beacon frames if there is no terminal requesting to establish a wireless connection within the continuous time period.

Figure 7:
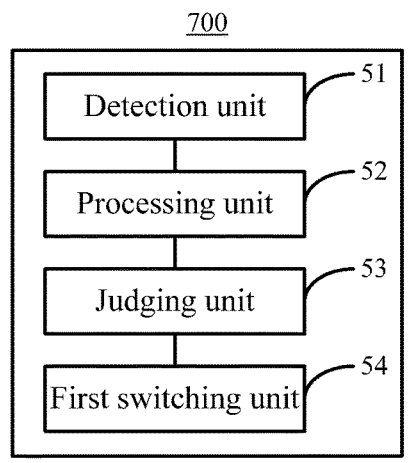
FIG. 7 is a block diagram illustrating an apparatus for controlling signal transmission according to another exemplary embodiment.

FIG. 7 is a block diagram illustrating an apparatus 700 for controlling signal transmission according to another exemplary embodiment. The apparatus 700 is similar to the apparatus 500 shown in FIG. 5, but further includes a judging unit 53 and a first switching unit 54. The judging unit 53 is configured to judge whether a wireless connection has ever been established with a requesting terminal sending probe request frames when the probe request frames sent by the requesting terminal are received. Thus, whether the requesting terminal is a strange device can be determined. The first switching unit 54 is configured to turn on the sending function when the judging unit 53 judges that a wireless connection with the requesting terminal has previously been established. That is, if the requesting terminal is not a strange device, the AP returns to the normal operation state.

Figure 8:
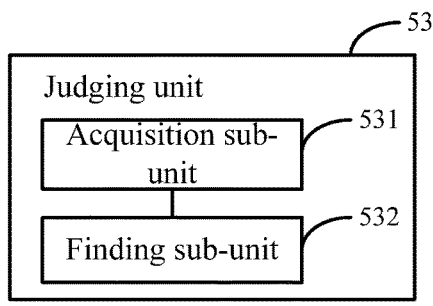
FIG. 8 is a block diagram illustrating an example of the judging unit shown in FIG. 7.

FIG. 8 is a block diagram illustrating an example of the judging unit 53. As shown in FIG. 8, the judging unit 53 includes an acquisition sub-unit 531 and a finding sub-unit 532. The acquisition sub-unit 531 is configured to acquire identification information of the requesting terminal that sends the probe request frames. The finding sub-unit 532 is configured to find whether a preset history database includes a historical connection device that matches the identification information of the requesting terminal. If there is such a historical connection device in the history database, the finding sub-unit 532 determines that a wireless connection with the requesting terminal has previously been established.

Figure 9:
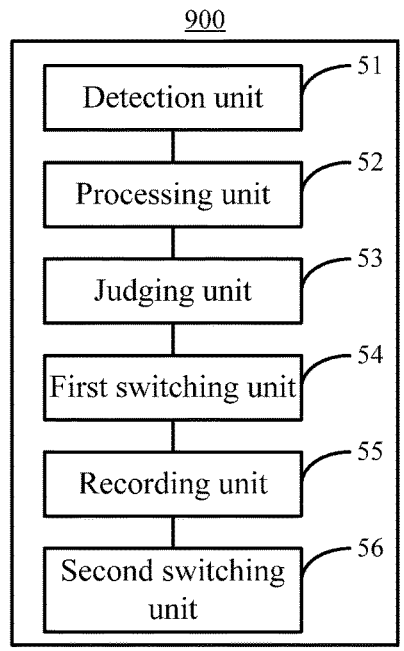
FIG. 9 is a block diagram illustrating an apparatus for controlling signal transmission according to another exemplary embodiment.

FIG. 9 is a block diagram illustrating an apparatus 900 for controlling signal transmission according to another exemplary embodiment. The apparatus 900 is similar to the apparatus 700 shown in FIG. 7, except that the apparatus 900 further includes a recording unit 55 and a second switching unit 56. The recording unit 55 is configured to record the accumulated number of probe request frames received from the requesting terminal when the judging unit 53 judges that no wireless connection has ever been established with the requesting terminal. The second switching unit 56 is configured to turn on the sending function when the accumulated number is greater than or equal to a preset number.

According to the present disclosure, when the accumulated number is relatively small, for example, smaller than the preset number, it indicates that the sending terminal may likely just go pass and there is no need to establish a wireless connection. Therefore, the request from such a requesting terminal may not need to be responded to and the operation state of the AP does not need to be switched. When the accumulated number is relatively large, for example, larger than or equal to the preset number, it indicates that the terminal is not moving in a wide range, and it is likely that the terminal does want to establish a wireless connection. Moreover, if there are other similar devices around the terminal, the operation state of the AP is switched, and the needs of all devices can be met.

In some embodiments, after the sending function of the AP is turned on, the AP may ignore all probe request frames from the requesting terminal. Instead, the AP sends out beacon frames to allow the terminal to scan and discover the AP. In some embodiments, the AP may respond to the last probe request frame sent by the requesting terminal, i.e., return a probe response frame.

Figure 10:
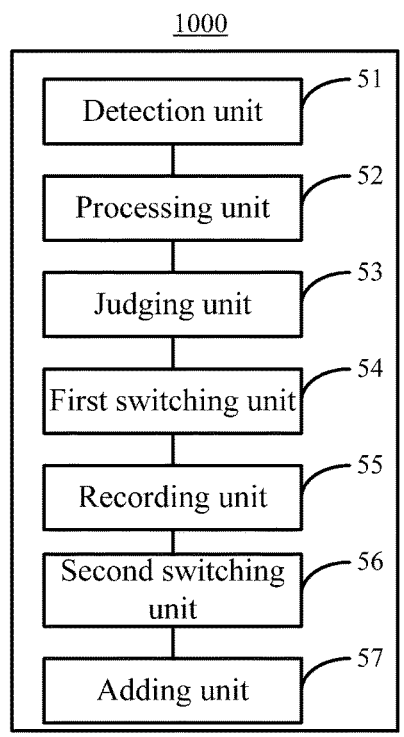
FIG. 10 is a block diagram illustrating an apparatus for controlling signal transmission according to another exemplary embodiment.

FIG. 10 is a block diagram illustrating an apparatus 1000 for controlling signal transmission according to another exemplary embodiment. The apparatus 1000 is similar to the apparatus 900 shown in FIG. 9, except that the apparatus 1000 further includes an adding unit 57. The adding unit 57 is configured to add the identification information of the requesting terminal into a preset blacklist if no wireless connection has previously been established with the requesting terminal and a current operation of establishing a wireless connection with the requesting terminal fails.

Consistent with the present disclosure, a state switching operation of the sending function is irrelevant to the probe request frames received from a terminal in the blacklist.

According to the present disclosure, by not responding to the request from a terminal recorded in the blacklist, the operation security of the AP can be improved and the power consumption of the AP can be reduced. Moreover, when the wireless connection with the requesting terminal cannot be successfully established, the AP still needs to remain in the normal operation state for a period of time, but it is possible that there will be no device requesting to establish a wireless connection during that period of time. This could be a waste of resources. Therefore, by adding a terminal that cannot successfully establish a wireless connection into the blacklist, the AP will not be woken by this terminal next time. As such, the power consumption of the AP can be reduced.

Functions of the apparatuses described above are similar to the methods described above, and thus detailed description thereof is omitted.

The apparatuses described above are merely illustrative. Units described as separated components may or may not be physically separated. Similarly, each unit described above and shown in the drawings as one unit may or may not be a physical unit, i.e., a unit may be located in one place or may be distributed in a plurality of network units. Some or all of the modules can be used to realize the purpose of the present disclosure according to actual needs.

In accordance with the present disclosure, there is further provided an apparatus for controlling signal transmission that includes a processor and a memory storing instructions executable by the processor. The memory can be, for example, a non-transitory computer-readable storage medium. The instructions, when executed by the processor, cause the processor to perform a method consistent with embodiments of the present disclosure.

In accordance with the present disclosure, there is further provided a terminal that includes a memory storing one or more programs, and one or more processors. The one or more programs include instructions that, when executed by the one or more processors, cause the one or more processors to perform a method consistent with embodiments of the present disclosure.

Figure 11:
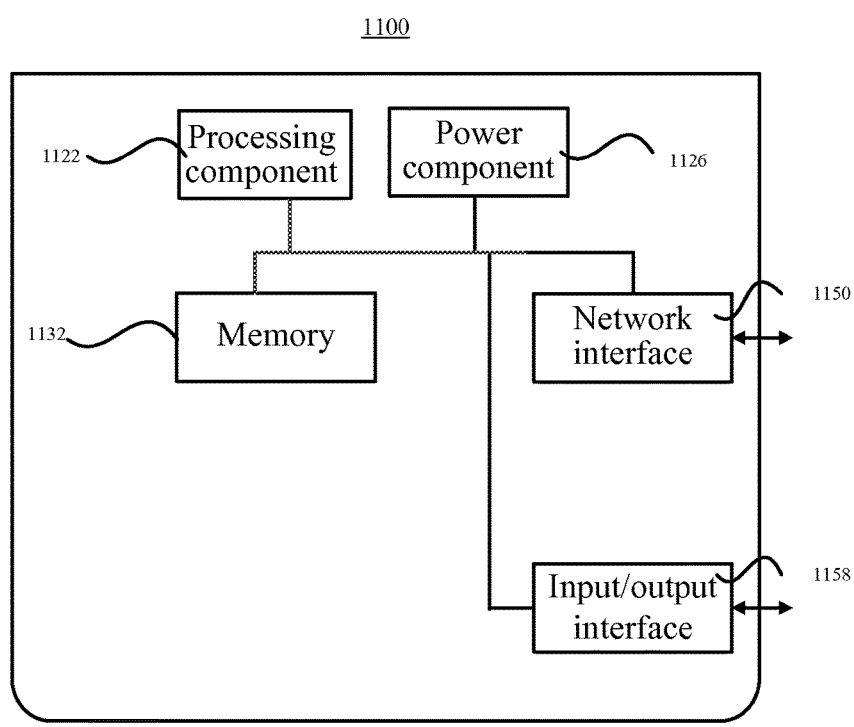
FIG. 11 is a structure diagram illustrating an apparatus for controlling signal transmission according to another exemplary embodiment.

FIG. 11 is a block diagram of a device 1100 for controlling signal transmission according to another exemplary embodiment. For example, the device 1100 may be provided as an AP, a wireless router, or a mobile device, such as a smart phone or a tablet device, that has an AP function. Referring to FIG. 11, the device 1100 includes a processing component 1122 that further includes one or more processors, and memory resources represented by a memory 1132 for storing instructions, such as application programs, executable by the processing component 1122. The application programs stored in the memory 1132 may include one or more modules, each of which corresponds to a set of instructions. Moreover, the processing component 1122 is configured to execute instructions for performing a method consistent with embodiments of the present disclosure.

The device 1100 further includes a power component 1126 configured to perform power management of the device 1100, wired or wireless network interface(s) 1150 configured to connect the device 1100 to a network, and an input/output (I/O) interface 1158. The device 1100 may operate based on an operating system stored in the memory 1132.

Therefore, according to the present disclosure, an AP's function of sending beacon frames is turned off when there is no terminal requesting to establish a wireless connection. As such, beacon frames are not sent when unnecessary. For example, when the user is not at home, the AP in the home can automatically stop sending beacon frames, and thus the power consumption of the AP can be reduced. On the other hand, when the user is back home, a mobile device carried by the user can actively send probe request frames to wake up the AP, such that the user can use the wireless network established by the AP.

After considering this description and carrying out the embodiments disclosed herein, those skilled in the art may easily anticipate other implementation aspects of the present disclosure. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure. The description and embodiments are only exemplary, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

What is claimed is:

1. A method for controlling signal transmission, comprising:
   detecting whether there is a requesting terminal that requests to establish a wireless connection;
   turning off a sending function of sending beacon frames and continuing to receive probe request frames, if there is no requesting terminal;
   receiving a probe request frame from a requesting terminal;
   judging whether a wireless connection with the requesting terminal was previously established;
   turning on the sending function if a wireless connection with the requesting terminal was previously established;
   updating, if no wireless connection with the requesting terminal was previously established, an accumulated number that records a number of probe request frames from the requesting terminal; and
   turning on the sending function when the accumulated number is greater than or equals to a preset number.

2. The method according to claim 1, wherein detecting whether there is a requesting terminal includes:
   detecting whether there is a requesting terminal in a continuous time period of a preset time length.

3. The method according to claim 1, wherein judging whether a wireless connection with the requesting terminal was previously established includes:
   acquiring identification information of the requesting terminal; and
   searching a preset history database to determine whether the history database contains a historical connection device that matches the identification information of the requesting terminal.

4. The method according to claim 1, further comprising:
adding identification information of the requesting terminal into a preset blacklist if an operation of establishing a wireless connection with the requesting terminal fails.

5. An electronic device, comprising:
a processor; and
a memory storing instructions that, when executed by the processor, cause the processor to:
detect whether there is a requesting terminal that requests to establish a wireless connection;
turn off a sending function of sending beacon frames and continue to receive probe request frames, if there is no requesting terminal;
receive a probe request frame from a requesting terminal;
judge whether a wireless connection with the requesting terminal was previously established;
turn on the sending function if a wireless connection with the requesting terminal was previously established;
update, if no wireless connection with the requesting terminal was previously established, an accumulated number that records a number of probe request frames from the requesting terminal; and
turn on the sending function when the accumulated number is greater than or equals to a preset number.

6. The electronic device according to claim 5, wherein the instructions further cause the processor to:
detect whether there is a requesting terminal in a continuous time period of a preset time length.

7. The electronic device according to claim 6, wherein the instructions further cause the processor to:
acquire identification information of the requesting terminal; and
search a preset history database to determine whether the history database contains a historical connection device that matches the identification information of the requesting terminal.

8. The electronic device according to claim 6, wherein the instructions further cause the processor to:
add identification information of the requesting terminal into a preset blacklist if an operation of establishing a wireless connection with the requesting terminal fails.

9. A non-transitory computer-readable storage medium storing instructions that, when executed by a processor of a terminal, cause the terminal to:
detect whether there is a requesting terminal that requests to establish a wireless connection;
turn off a sending function of sending beacon frames and continue to receive probe request frames, if there is no requesting terminal;
receive a probe request frame from a requesting terminal;
judge whether a wireless connection with the requesting terminal was previously established;
turn on the sending function if a wireless connection with the requesting terminal was previously established;
update, if no wireless connection with the requesting terminal was previously established, an accumulated number that records a number of probe request frames from the requesting terminal; and
turn on the sending function when the accumulated number is greater than or equals to a preset number.

* * * * *